United States Patent [19]
Ronsse, Jr.

[11] 3,911,263
[45] Oct. 7, 1975

[54] STEREO VIEWER ACCUMULATOR

[75] Inventor: August J. Ronsse, Jr., Los Altos, Calif.

[73] Assignee: Itek Corporation, Lexington, Mass.

[22] Filed: Mar. 19, 1974

[21] Appl. No.: 452,499

[52] U.S. Cl............................. 240/2 AT; 226/118
[51] Int. Cl.² ....................................... F21V 33/00
[58] Field of Search............ 240/2 AT; 355/22, 46; 352/57, 60, 129; 353/7, 26; 350/133, 135, 141, 143; 226/118

[56] References Cited
UNITED STATES PATENTS

| | | | |
|---|---|---|---|
| 1,109,917 | 9/1914 | Gall | 355/46 |
| 2,738,707 | 3/1956 | Sackett et al. | 350/141 X |
| 2,897,721 | 8/1959 | Cohn et al. | 350/135 |
| 3,204,886 | 9/1965 | Chitayat et al. | 350/135 X |

Primary Examiner—Fred L. Braun
Attorney, Agent, or Firm—Homer O. Blair; Robert L. Nathans; Gerald H. Glanzman

[57] ABSTRACT

A system for allowing a convenient side-by-side viewing comparison of a pair of stereo views which are substantially separated from each other along the length of a film strip. A first segment of the film strip is routed from a supply reel across the top of a light table to the opposite side of the light table. The film strip is then guided to a storage and accumulator assembly having oppositely placed first and second pluralities of rollers on which a length of the film may be accumulated and transported. The accumulator assembly is mounted to the light table by a frame, and is positioned over the light table to run diagonally across the light table such that after the film exits from the accumulator assembly a second segment of the film strip may be placed across the light table parallel to the first segment. The length of film in the accumulator is adjusted so that the separated stereo pairs on the film strip are viewed side-by-side. With this arrangement the first and second segments of the film strip may be transported across the light table parallel to each other which results in common stereo pairs being transported across the light table parallel to each other.

6 Claims, 1 Drawing Figure

U.S. Patent   Oct. 7,1975   3,911,263
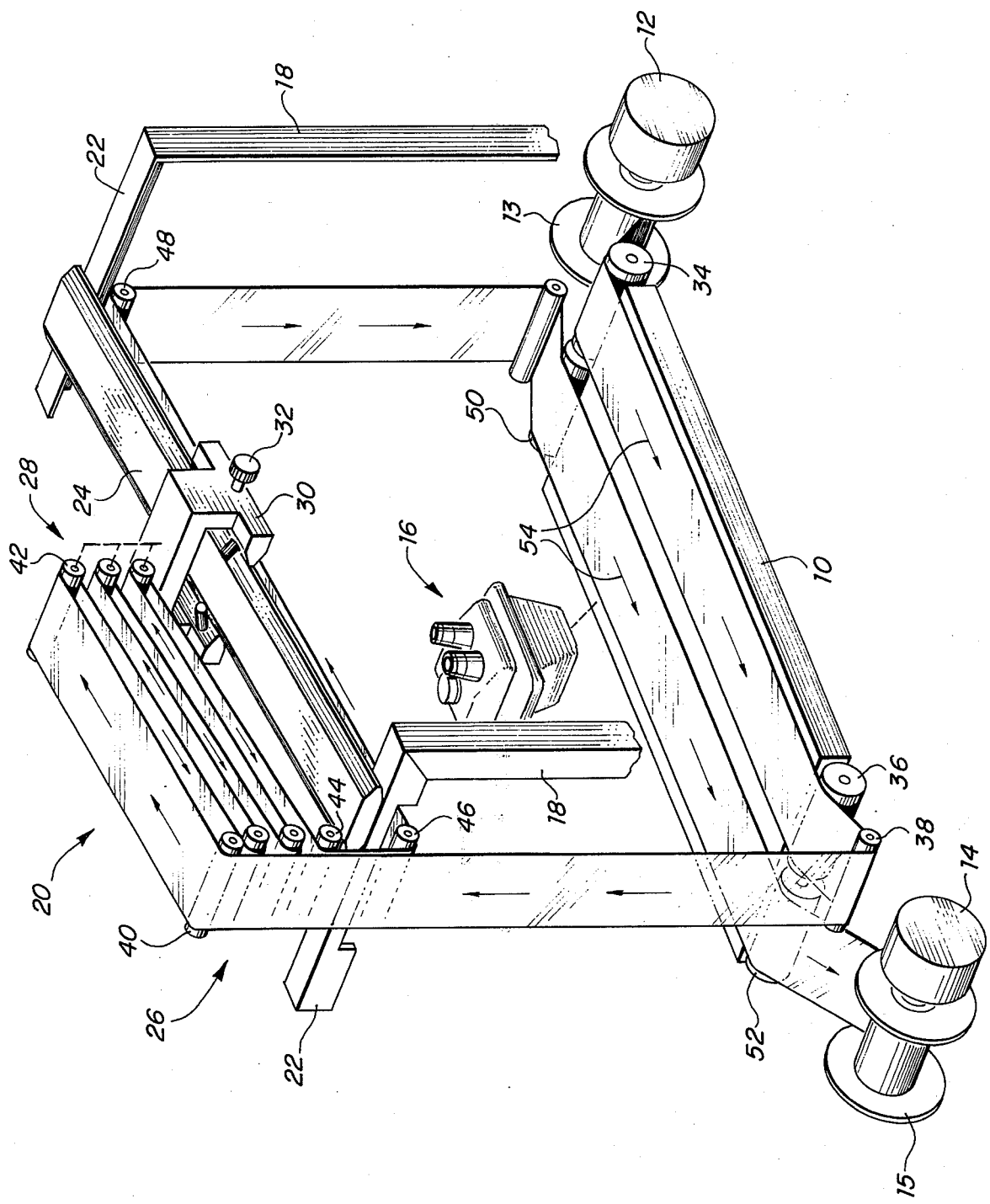

STEREO VIEWER ACCUMULATOR

BACKGROUND OF THE INVENTION

The present invention relates generally to apparatus for examining stereo views of a common scene on a light table, and more particularly pertains to a new and improved system wherein two stereo views, which are substantially separated from each other along the length of a film strip, may be conveniently placed side-by-side on a light table for a simultaneous detailed comparison.

In the photo-reconnaissance field, there is a type of camera, termed an optical bar camera, which is commonly utilized to take stereo photographs of terrain below an aircraft. The manner of operation of the camera is such that each photographic frame of a stereo pair is separated from the other photographic frame in that stereo pair by several other frames. Information about the photographed scene is extracted from the pair of stereo photographs by a detailed side-by-side comparison of the stereo views. The separated arrangement of the stereo views along the length of the film strip has provided some difficulty in providing a later side-by-side placement of the stereo views.

One solution which has been utilized to allow the convenient viewing of such stereo pairs has been to cut the stereo pairs from the film strip. The cut segments are then mounted side-by-side on a light table. This solution to the problem has a number of apparent disadvantages which will not be gone into in detail.

SUMMARY OF THE INVENTION

In accordance with a preferred embodiment, apparatus is disclosed for allowing a side-by-side viewing comparison on a viewing surface of first and second data sections of a data strip, which data sections are substantially separated along the length of the strip. Further the apparatus allows the side-by-side movement on the viewing surface of other similarly separated data sections. The apparatus includes a data strip accumulator which transports a length of the data strip through it, and is adjustable as to the length of the accumulated data strip in it. The data strip is transported across the viewing surface, and then is routed to the data strip accumulator. After it has been transported through the accumulator, it is routed back across the viewing surface substantially parallel to the first section of the data strip running across the viewing surface. Further, the preferred embodiment provides such apparatus wherein the data strip accumulator includes a first plurality of rollers and a second plurality of rollers spaced from the first plurality of rollers. The distance between the first and second plurality of rollers is adjustable to adjust the length of the data strip in the accumulator. Also, the preferred embodiment provides such apparatus which includes a frame for mounting the accumulator relative to the viewing surface such that it extends across the viewing surface, the first plurality of rollers is fixed on the frame and the second plurality of rollers is adjustably mounted along a support member of the frame such that it may be moved along said support member either closer to or further away from the first plurality of rollers. Further, in the preferred embodiment, the data strip includes a length of film having different photographic frames on it, the first and second data strip sections are stereo photographic frames of the same subject. The viewing surface includes a light table, and the apparatus functions to allow the side-by-side comparison of stereo pictures of the same subject.

BRIEF DESCRIPTION OF THE DRAWING

The FIGURE illustrates a perspective view of a typical light table having a film accumulator mounted overhead.

DETAILED DESCRIPTION OF A PREFERRED EMBODIMENT

Referring to the drawing, there is illustrated a light table 10 which is a light transmissive surface having illumination underneath such that the details in a film strip placed on top of the light table may be readily examined. The light table 10 typically includes a first torque motor 12, which drives a first film spool 13, and a second torque motor 14 which drives a second film spool 15. One of the film spools is a supply spool and the second a take-up spool. Either of the spools 13 or 15 might assume either role. The torque motors 12 and 14 are reversible, variable torque motors. If spool 13 is the supply spool and spool 15 the take-up spool and it is desired to drive film from the supply to the take-up spool, then an electrical signal would be supplied to torque motor 14 to pull the film strip across the light table. A second electrical signal would be applied to torque motor 12 to apply a reverse, but lesser, torque to spool 13 to maintain the film strip under tension while it is being transported across the light table. The light table with torque motors is a commercially available item, and in one embodiment might be Model 940, MIN 1 and MIN 2, available from Richards Corporation, PO Drawer 340, McLean, Virginia 22101.

As shown, the light table is sufficiently wide to accommodate two strips of film placed side-by-side on it. Strips of film are commonly arranged side-by-side on the light table when they contain stereo views of a common subject. A stereo viewer 16 mounted above the light table, and movable relative to the light table, enables a comparison of details in the two stereo views. Stereo viewers are commercially available, and in one embodiment it might be a Model 240, 15 inch, stereo viewer from Bausch and Lomb Corporation.

A frame, including two forward corner members 18, is mounted to the light table to support a film accumulator 20. The frame includes two side frame members 22 which extend back across the table from the frame members 18 on each side of the table. A support frame member 24 extends between the two side frame members 22 such that it is positioned overhead of the light table while extending across its length in a diagonal direction from the left front portion of the light table to the right rear portion of the light table. The film accumulator 20 includes a first plurality of rollers 26 which are fixedly mounted to the frame and a second plurality of rollers 28 which are mounted on the support frame member 24 for selective movement along it.

In the embodiment illustrated in the FIGURE, the two side edges of the support frame member 24 are V shaped. The second plurality of rollers 28 are mounted to a movable support 30 which includes eight roller bearings to allow movement of the support 30 along the frame member 24. As shown, the eight roller bearings include four roller bearings on each side of the frame member, two of which are mounted for engagement with the top of the V edge and two of which are mounted for engagement with the bottom of the V edge. A knobbed adjustment screw 32 extends through one side of the movable support 30 for frictional engagement with one edge of the support member 24. To adjust the relative position of rollers 28, screw 32 is loosened, the support 30 is moved along the frame member 24 until the rollers 28 are in a desired position, and then screw 32 is tightened against frame member 24 to fixedly mount the rollers in position.

The path of the film in the illustrated apparatus will now be traced. The film proceeds from supply spool 13 to an idler roller 34, then along the top and length of the light table 10 to a second idler roller 36, and then to a third idler roller 38 wherein the direction of the film is changed to proceed to the film accumulator 20. The film then proceeds to the top roller 40 of the first, fixed plurality of rollers, then across to the top roller 42 of the second plurality of rollers, and then is wound back and forth between successively lower rollers in each of the first and second plurality of rollers until it reaches the bottom roller 44 of the first plurality of rollers, at which point the film is directed downward to an idler roller 46, and then across the film table to another idler roller 48 whereat the direction is changed downward toward the light table. An idler roller 50 positioned on the side of the film table then changes the direction of the film so that a second segment of the film is routed across the light table, generally parallel to the first segment of film lying on the light table, and then to another idler roller 52 which directs the film to take-up spool 15.

It has been mentioned that the support frame member 24 extends in a diagonal direction from the left front portion of the light table to the right rear portion of the light table. This diagonal position allows a film exiting from roller 38 after a first pass over the light table to be aligned with the first roller 40 of the accumulator, and also allows film exiting from the roller 48 to be aligned with idler roller 50 which directs the film strip for a second pass over the light table. It should be noted that the diagonal position of the accumulator assembly causes a slight air twist in the film as it travels from roller 38 to roller 40 and a slight air twist in the film as it travels from roller 48 to roller 50.

In operation, the film is threaded through the path traced above, and the position of the second plurality of rollers 28 is adjusted so that the first and second segments of film on the light table are side-by-side stereo views of a common subject. The adjustment screw 32 is then tightened to fix the position of the second plurality of rollers 28. Each particular film strip from an optical bar camera has stereo pair frames spaced apart by a given predetermined number of frames. In a typical film strip, stereo pairs are separated from each other along the film strip by as many as two to five other frames. When the apparatus is utilized to simultaneously view stereo pairs it is adjusted to position a first pair of stereo frames side-by-side on the light table. Then if the torque motors 12 and 14 are activated to move the film strip from the supply roller through the apparatus to the take-up roller, subsequent common stereo pairs will also come into side-by-side registration on the top of the light table and will travel in unison across the light table, as indicated by arrows 54. Anywhere from several feet to several hundred feet of film may be stored in the accumulator depending upon the distance between the first and second plurality of rollers and the number of rollers in each of the plurality of rollers.

In the illustrated embodiment the accumulated assembly is mounted over the light table. Other embodiments might be built with the accumulator assembly located in other positions. For instance, the accumulator assembly might be located behind the light table rather than overhead. This could be accomplished by folding the film path to the accumulator by 90° by utilizing either air bearings or skew bars.

In the preferred embodiment one set of rollers is fixedly mounted to the frame while the second set of rollers is movable along the frame. In another embodiment, both sets of rollers might be movable along the frame. Also, the preferred embodiment utilizes rollers to transport and store film in the accumulator. In other embodiments other mechanisms such as air bearings might be utilized in place of the rollers.

This invention has numerous advantages over the prior art technique of cutting up a film strip into segments to allow segments containing a common stereo view to be placed side-by-side on top of the film table. Storage of the film is facilitated in that the film may remain stored on spools. Handling of the film is kept to a minimum so that the film will pick-up a least amount of dirt and fingerprints. Very importantly, once the position of the accumulator is set for a particular film strip, common stereo views are transported side-by-side across the top of the light table. This allows easy, convenient, and rapid access on top of the light table to any particular pair of stereo views on the film strip. In summary, the handling, storage, and access to data provided by the present invention are far improved over the prior art method of cutting the film strips into segments.

While several embodiments have been described, the teachings of this invention will suggest many other embodiments to those skilled in the art.

I claim:

1. Apparatus for allowing a side-by-side viewing comparison on a viewing surface of first and second data sections of a data strip, which first and second data sections are substantially separated from each other along the length of the data strip, and for further allowing the side-by-side movement on the viewing surface of data sections which are also substantially separated from each other along the data strip, and comprising:
   a. a viewing surface for allowing the examination of data sections on the data strip;
   b. an adjustable data strip accumulator means, having a data strip entrance and a data strip exit, for transporting a length of accumulated data strip through it, said accumulator means being adjustable as to the length of the data strip accumulated in it; and,
   c. means for routing and transporting the data strip across the viewing surface from a first side to a second side of the viewing surface to position the first section of said data strip on said viewing surface, then from said second side of the viewing surface to said entrance to said data strip accumulator means, and after the data strip has been transported through said accumulator means then from said exit of said data strip accumulator means to said first side of said viewing surface, and then across said viewing surface to position the second section of said data strip on said viewing surface substantially parallel to the first section of the data strip running from said first side to said second side of the viewing surface, whereby the amount of the data strip accumulated in said accumulator means may be adjusted until data sections of interest are mounted side-by-side on the viewing surface for a detailed comparison and may be transported in the same direction on the viewing surface such that other data sections also substantially separated from each other along the data strip are moved side-by-side across the viewing surface.

2. Apparatus as set forth in claim 1 wherein said adjustable data strip accumulator means includes a first plurality of rollers and a second plurality of rollers spaced from said first plurality of rollers, said accumulator means including means for adjusting the distance between said first plurality of rollers and said second plurality of rollers, whereby the data strip may be routed back and forth between the rollers of said first plurality of rollers and the rollers of said second plurality of rollers and the length of the data strip in the accumulator means may be adjusted by adjusting the distance between said first plurality of rollers and said second plurality of rollers.

3. Apparatus as set forth in claim 2 and including a frame means for mounting said accumulator means relative to said viewing surface such that said accumulator means extends from said first side of the viewing surface to said second side of the viewing surface, and wherein said first plurality of rollers is fixed relative to said frame, said frame means includes a support member extending from said first side of the viewing surface to said second side of the viewing surface and from said first plurality of rollers to said second plurality of rollers, and said second plurality of rollers is mounted on said support member such that it may be moved along said support member either closer to or farther away from said first plurality of rollers.

4. Apparatus as set forth in claim 1 wherein said viewing surface includes a light table, said data strip includes a length of film having different photographic frames on it, said first and second data sections are stereo photographic frames of the same subject, whereby the apparatus allows the side-by-side comparison of stereo pictures of the same subject.

5. Apparatus as set forth in claim 4 wherein said adjustable data strip accumulator means includes a first plurality of rollers and a second plurality of rollers spaced from said first plurality of rollers, said accumulator means including means for adjusting the distance between said first plurality of rollers and said second plurality of rollers, whereby the film may be routed back and forth between the rollers of said first plurality of rollers and the rollers of said second plurality of rollers and the length of the film in the accumulator means may be adjusted by adjusting the distance between said first plurality of rollers and said second plurality of rollers.

6. Apparatus as set forth in claim 5 and including a frame means for mounting said accumulator means relative to said viewing surface such that said accumulator means extends from said first side of the viewing surface to said second side of the viewing surface, and wherein said first plurality of rollers is fixed relative to said frame, said frame means includes a support member extending from said first side of the viewing surface to said second side of the viewing surface and from said first plurality of rollers to said second plurality of rollers, and said second plurality of rollers is mounted on said support member such that it may be moved along said support member either closer to or farther away from said first plurality of rollers.

* * * * *